US007607092B2

(12) United States Patent
Rogers et al.

(10) Patent No.: US 7,607,092 B2
(45) Date of Patent: Oct. 20, 2009

(54) INTEGRATED METHOD AND SYSTEM FOR ACCESSING AND AGGREGATING DISPARATE REMOTE SERVER SERVICES

(75) Inventors: Steven Rogers, Austin, TX (US); William W. Cowan, Austin, TX (US)

(73) Assignee: NexQuest, Inc., Austin, TX (US)

( * ) Notice: Subject to any disclaimer, the term of this patent is extended or adjusted under 35 U.S.C. 154(b) by 0 days.

(21) Appl. No.: 11/420,976

(22) Filed: May 30, 2006

(65) Prior Publication Data

US 2007/0277110 A1 Nov. 29, 2007

Related U.S. Application Data

(60) Provisional application No. 60/685,341, filed on May 27, 2005.

(51) Int. Cl.
*G06F 3/00* (2006.01)
*G06F 15/177* (2006.01)
*G06F 3/048* (2006.01)

(52) U.S. Cl. .................. 715/734; 715/733; 715/742; 715/744; 715/714; 715/792; 715/767

(58) Field of Classification Search .......... 715/742, 715/733, 744, 747, 792, 767
See application file for complete search history.

(56) References Cited

U.S. PATENT DOCUMENTS

| 6,115,040 | A | 9/2000 | Bladow et al. | |
|---|---|---|---|---|
| 6,341,310 | B1 * | 1/2002 | Leshem et al. | 709/223 |
| 6,493,717 | B1 * | 12/2002 | Junkin | 707/102 |
| 6,549,944 | B1 * | 4/2003 | Weinberg et al. | 709/224 |
| 6,636,242 | B2 * | 10/2003 | Bowman-Amuah | 715/764 |
| 6,721,713 | B1 * | 4/2004 | Guheen et al. | 705/1 |
| 6,871,220 | B1 | 3/2005 | Rajan et al. | |
| 7,325,204 | B2 * | 1/2008 | Rogers | 715/792 |
| 2002/0027570 | A1 * | 3/2002 | Muto et al. | 345/782 |
| 2002/0049788 | A1 * | 4/2002 | Lipkin et al. | 707/513 |
| 2003/0052916 | A1 | 3/2003 | Stern | |

(Continued)

FOREIGN PATENT DOCUMENTS

WO 0135259 A2 5/2001

OTHER PUBLICATIONS

Introducing the all new My Yahoo! Retrieved from the Internet: 20060223180118/ http:/lau.my.yahoo.comlslintllau/about/index_guest.html>; Feb. 23, 2006; relevant to claims 1, 2, 7, 11, 14, 17, 21, 24.*

(Continued)

*Primary Examiner*—Dennis-Doon Chow
*Assistant Examiner*—Linh K Pham
(74) *Attorney, Agent, or Firm*—HulseyIP Intellectual Property Lawyers, P.C.

(57) ABSTRACT

A system and method for aggregating disparate web services and functionality via a graphical user interface, the system and method includes generating a graphical user interface. The graphical user interface includes at least one active window capable of interfacing with a plurality of remote servers and initiating multiple threads with the plurality of remote servers. The system and method aggregates the functionality and services of the plurality of remote servers, wherein the aggregated functionality and services of the plurality of remote servers is controlled via the graphical user interface.

15 Claims, 13 Drawing Sheets

U.S. PATENT DOCUMENTS

| | | | | |
|---|---|---|---|---|
| 2003/0058277 | A1* | 3/2003 | Bowman-Amuah | 345/765 |
| 2003/0084452 | A1 | 5/2003 | Ryan et al. | |
| 2003/0182274 | A1* | 9/2003 | Oh | 707/3 |
| 2005/0060664 | A1* | 3/2005 | Rogers | 715/810 |
| 2006/0069604 | A1* | 3/2006 | Leukart et al. | 705/9 |
| 2006/0184537 | A1* | 8/2006 | Sauve et al. | 707/10 |
| 2006/0218500 | A1* | 9/2006 | Sauve et al. | 715/767 |
| 2006/0230356 | A1* | 10/2006 | Sauve et al. | 715/777 |

OTHER PUBLICATIONS

Google Webpage Retrieved from the Internet: http:/lweb.archieve.orglweb/20050520002107/http://www. google.com/ig>; May 20, 2005; relevant to claims 1-24.*

Web Banner—From Wikipedia, the free Encyclopedia; Retrieved from the Internet: http:/lweb.archieve.org/web/20050417071539/http:/len.w k ped a.org/w k/Banner_ad>; Apr. 17, 2005; re evant to c a ms 8, 12.*

Introducing the all new My Yahoo! Retrieved from the Internet: <URL:http://web.archive.org/web/20060223180118/ http://au.my.yahoo.com/s/intl/au/about/index_guest.html>; Feb. 23, 2006; relevant to claims 1, 2, 7, 11, 14, 17, 21, 24.

iGoogle Webpage Retrieved from the Internet: <URL: http://web.archieve.org/web/20050520002107/http://www. google.com/ig>; May 20, 2005; relevant to claims 1-24.

Web Banner—From Wikipedia, the free Encyclopedia; Retrieved from the Internet: <URL: http://web.archive.org/web/20050417071539/http://en.wikipedia.org/wiki/Banner_ad>; Apr. 17, 2005; relevant to claims 8, 12.

\* cited by examiner

INTEGRATED METHOD AND SYSTEM FOR ACCESSING AND AGGREGATING DISPARATE REMOTE SERVER SERVICES

This application claims the benefit of U.S. Provisional Application Ser. No. 60/685,341, entitled "Integrated Method And System For Accessing Internet And Telephony Services" filed May 27, 2005, under 35 U.S.C. §119(e).

FIELD

This disclosure pertains to a method for aggregating remote services and more specifically the aggregating common resources from and establishing multiple simultaneous links with web services sites via a graphical user interface.

BACKGROUND OF THE INVENTION

The popularity of the Internet has given rise to the employ of the web browser as a universal client, replacing older specialized client-server software systems. The primary advantage of this approach lies in the ubiquity and low cost of browser software. However, web browsers were originally designed for traversing hyperlinked multi-media information rather than serving as a remote processing client. They provide features for hyperlink navigation such as a Forward button, a Back button, and bookmarks, but these navigation features are usually incompatible with web applications, typically causing the application to malfunction if they are used.

Many companies have turned to this model as a way to connect with existing customers, while others have built companies based entirely on interacting with customers through the Internet. Consequently, the average Internet user has many accounts with various online service providers many of which perform the same function, and maintain redundant remote data sets, such as calendaring, e-mail accounts, instant messaging (IM), IM handles, address books and contacts just to name a few. The most common example is multiple web e-mail accounts hosted by such providers as Yahoo! And MSN, each with its own remote address book, calendar and contacts list.

Consequently, remote services have become isolated silos or islands of functionality and data. Web browsers, by design, do not facilitate data sharing or any form of interoperability across remote services. For instance, a user of a Yahoo account cannot start an instant messaging session with someone who has a hotmail account. Therefore, either or both parties must acquire accounts on the other hosting servers site to be able to engage in this activity. While inconvenient at best, the parties now have two accounts with probably different user names and logins and IM handles. Additionally, addresses, contacts, calendars etc. of the newer account will not be as robust as the first account.

Prior Art FIG. 1 depicts conventional means 2 for accessing data and services form multiple web sites and/or service providers. The user 4 must initiate multiple web browser instances 6 with their attendant usernames and log-ins applying similar but different communications protocols 8 to access the hosting providers functions and services 10. As seen in FIG. 1, the user must access and invoke each of the remote services separately via one or more browsers. No data is shared among the service providers nor is there any navigational support for any complimentary or redundant functions and/or services.

The prior art is deficient in that it does not provide for the utilization of one browser to access multiple service providers

SUMMARY OF THE INVENTION

The present invention has been made in view of the above circumstances and has as an aspect a system and method for aggregating services of remote servers.

A further aspect of the present invention can be characterized as software product for directing a general purpose computer to generate threads of execution to aggregate functionality and services of disparate web service providers.

A still further aspect of the present invention can be characterized as means for conducting and initiating multiple simultaneous sessions with remote servers.

Additional aspects and advantages of the invention will be set forth in part in the description which follows, and in part will be obvious from the description, or may be learned by practice of the invention. The aspects and advantages of the invention will be realized and attained by means of the elements and combinations particularly pointed out in the appended claims.

To achieve these and other advantages and in accordance with the purpose of the present invention, as embodied and broadly described, the present invention can be characterized according to one aspect the invention as a method for aggregating disparate web services and functionality via a graphical user interface, the method including the steps of generating a graphical user interface. The graphical user interface includes at least one active window capable of interfacing with a plurality of remote servers and initiating multiple threads with the plurality of remote servers. The method aggregates the functionality and services of the plurality of remote servers, wherein the aggregated functionality and services of the plurality of remote servers is controlled via the graphical user interface.

The present invention can be still further characterized according to one aspect the invention as a system for aggregating and displaying disparate web services and functionality, the system includes a processor having memory, a display in communication with the processor and a software program, wherein the software program resides on a computer readable medium and is capable of directing the processor to perform the steps of generating a graphical user interface, wherein the generated graphical user interface further includes active windows capable of communicating and controlling data flow to and from a plurality of web services sites; initiating multiple threads linking the graphical user interface and the web services sites; and synchronizing common data residing at the plurality of web services sites and accessing and controlling the data flow to and from the web services sites via the active windows of the graphical user interface.

The present invention can be still further characterized according to one aspect the invention as a system for aggregating and displaying disparate web services and functionality, the system includes a processor having memory, a display in communication with the processor and a software program, wherein the software program resides on a computer readable medium and is capable of directing the processor to perform the steps of generating a graphical user interface, wherein the generated graphical user interface further includes active windows capable of communicating and controlling data flow to a from a plurality of web services sites; initiating multiple threads linking the graphical user interface and the web services sites; and synchronizing common data residing at the plurality of web services sites and accessing and controlling the data flow to and from the web services sites via the active windows of the graphical user interface.

The present invention can be additionally characterized according to one aspect of the invention as a method for aggregating disparate web services and functionality, the method includes means for generating a graphical user interface, which includes multiple active windows wherein each window capable of communicating with and directing a plurality of remote servers hosting the web services. The method further includes means for initiating and conducting simultaneously multiple sessions with the remote servers and means for aggregating and accessing functionality and services of the plurality of remote servers via the graphical user interface.

It is to be understood that both the foregoing general description and the following detailed description are exemplary and explanatory only are not restrictive of the invention, as claimed.

BRIEF DESCRIPTIONS OF THE DRAWINGS

The accompanying drawings, which are incorporated in and constitute a part of this specification, illustrate several embodiments of the invention and together with the description, serve to explain the principles of the invention.

FIG. 1 presents a prior art web browses for providing remote access in cooperation with the functions of the present invention;

FIG. 2 depicts an exemplary manner in which the present invention permits control of remote functions;

FIG. 3 provides an exemplary user interface of the present invention;

FIG. 4 shows a high level typology of the present invention;

FIG. 5 presents the user interface of the present invention with respect to various functional windows;

Figure 10:
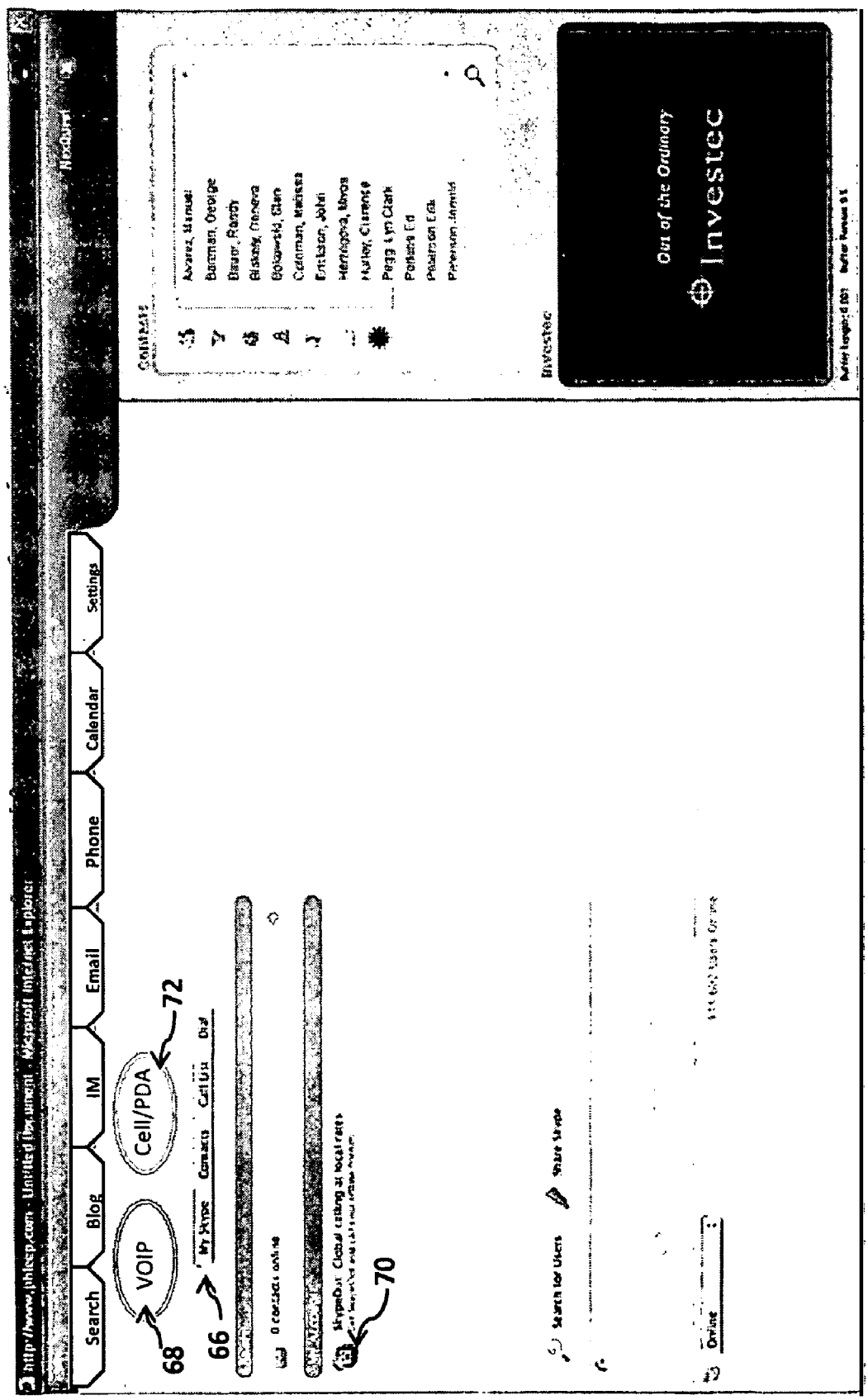
Figure 11:
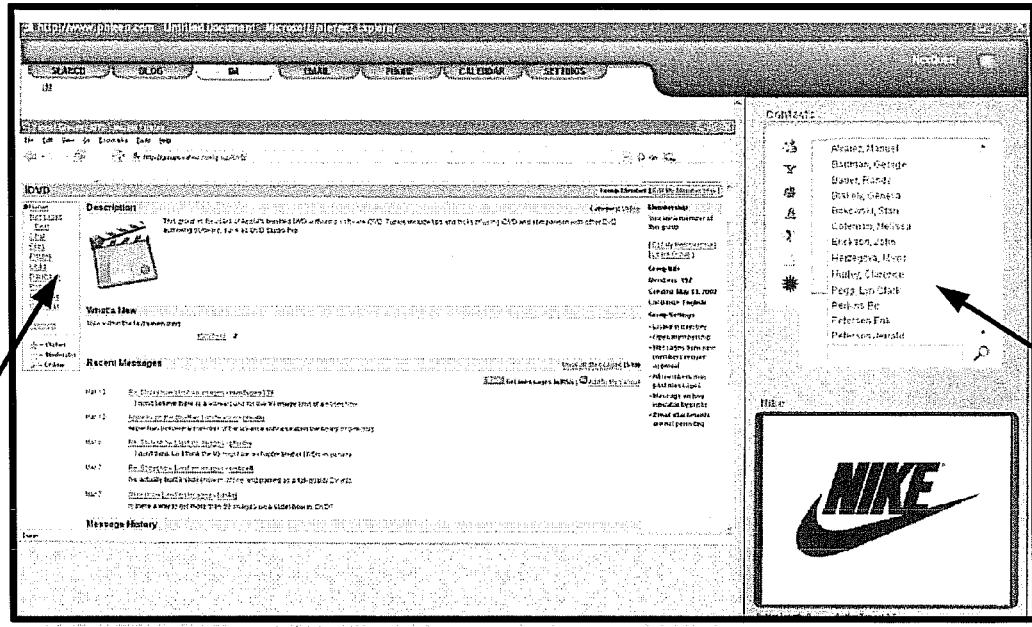
Figure 12:
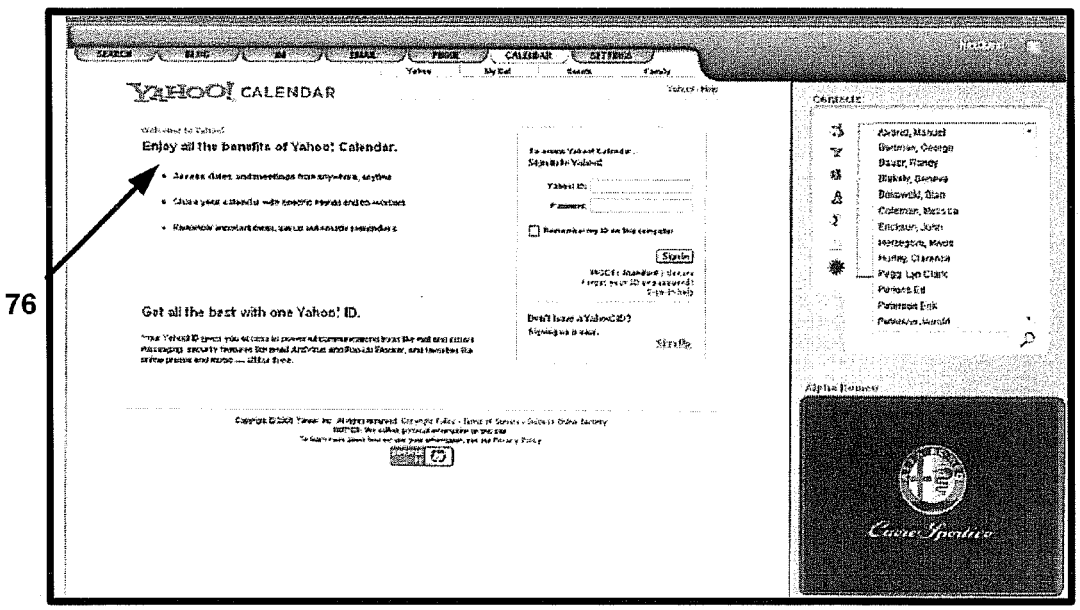
Figure 13A:
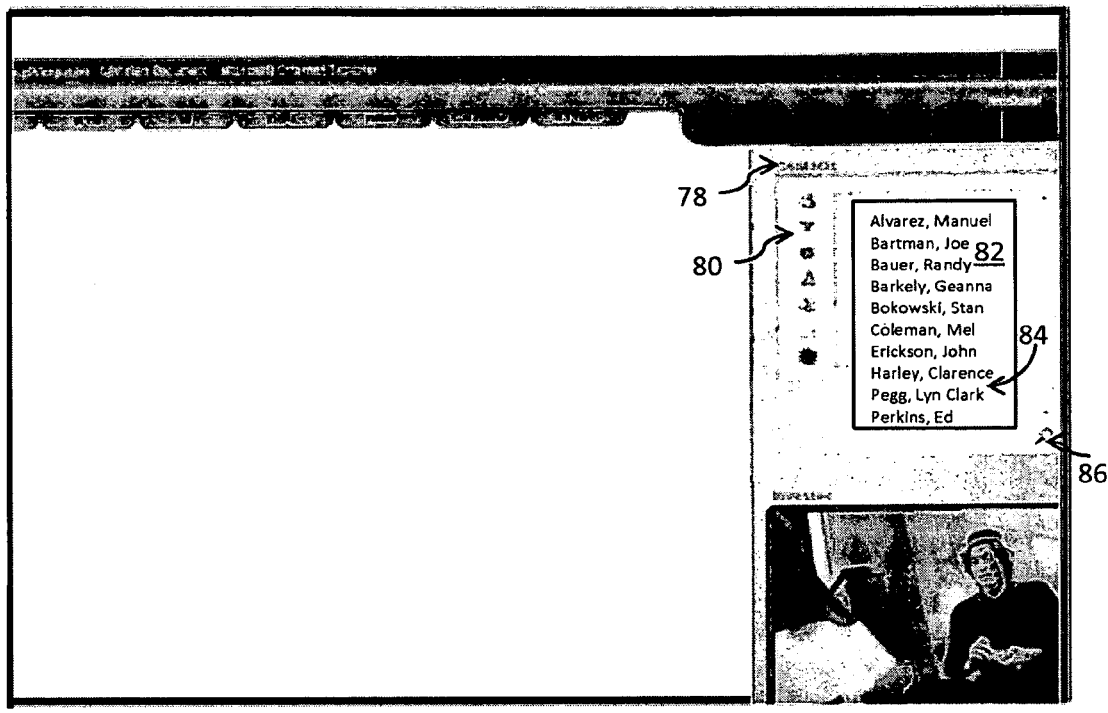
Figure 13B:
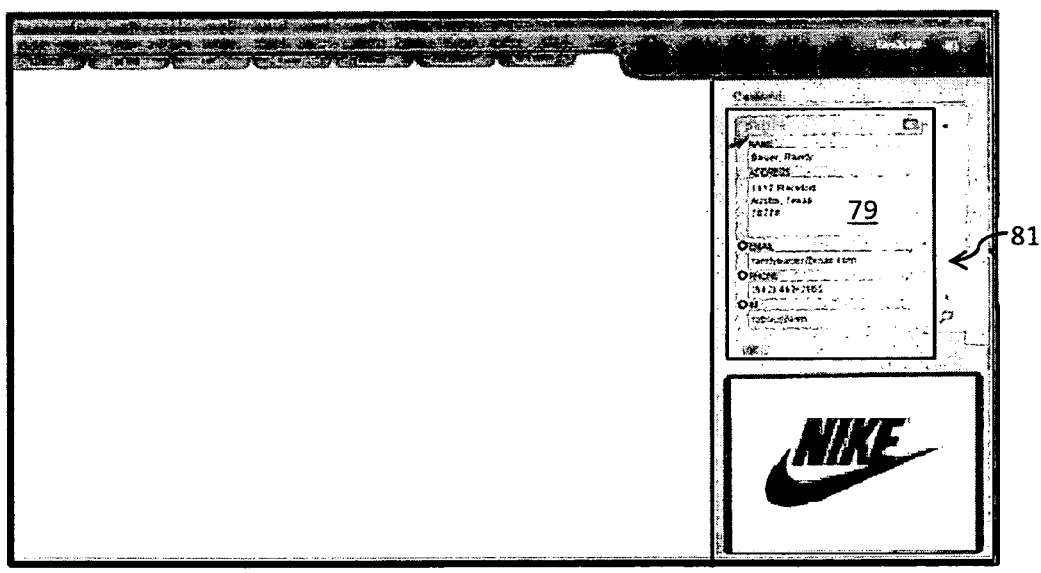
Figure 14:
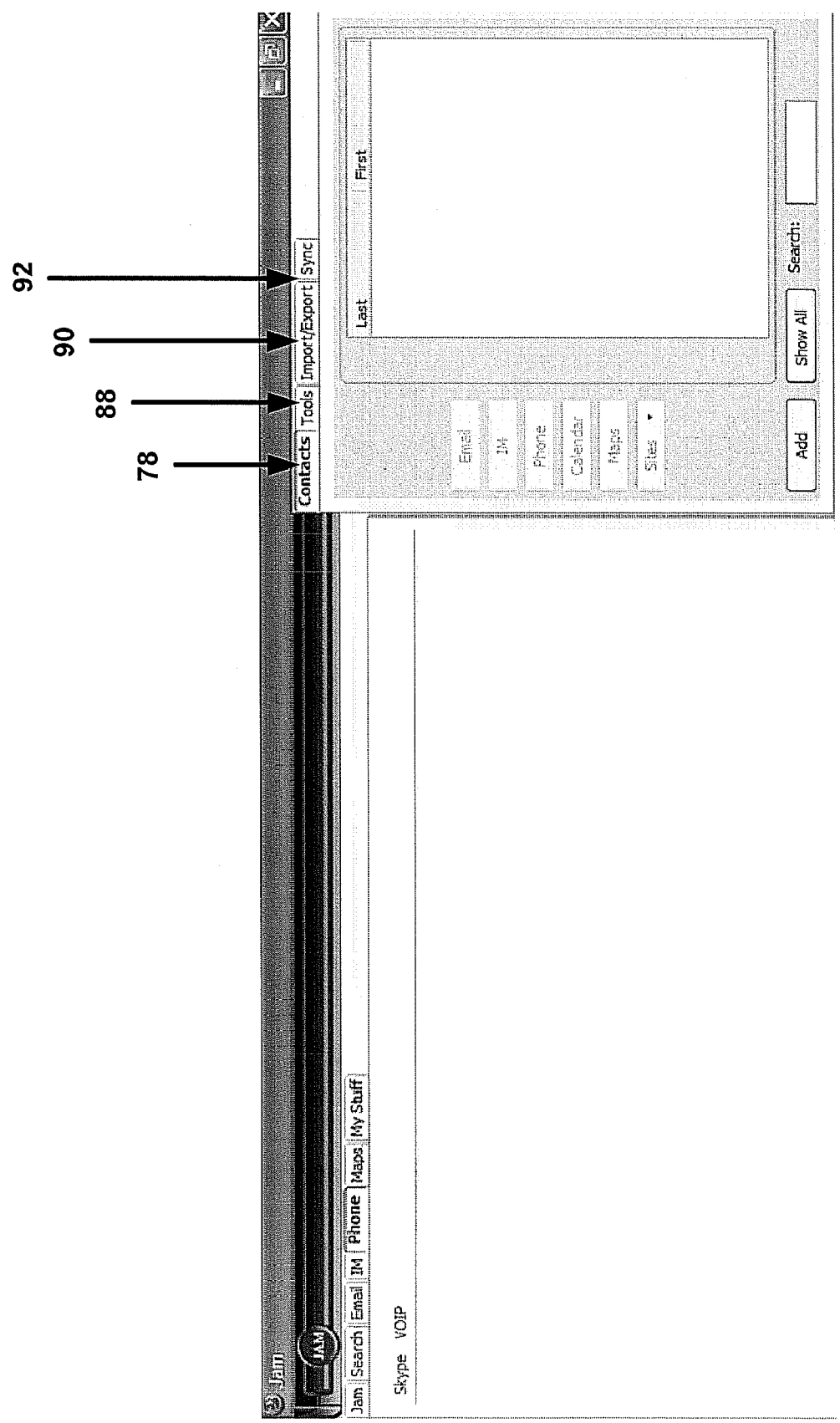
Figure 15:
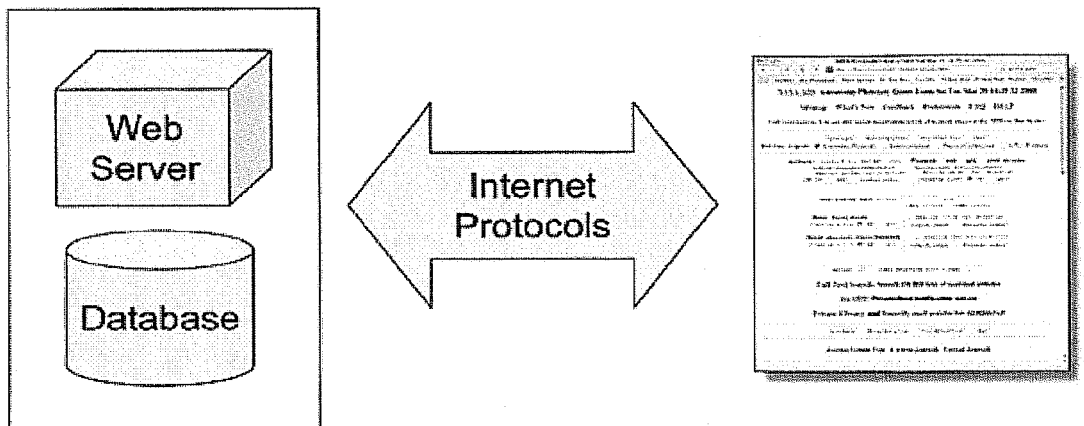
Figure 16:
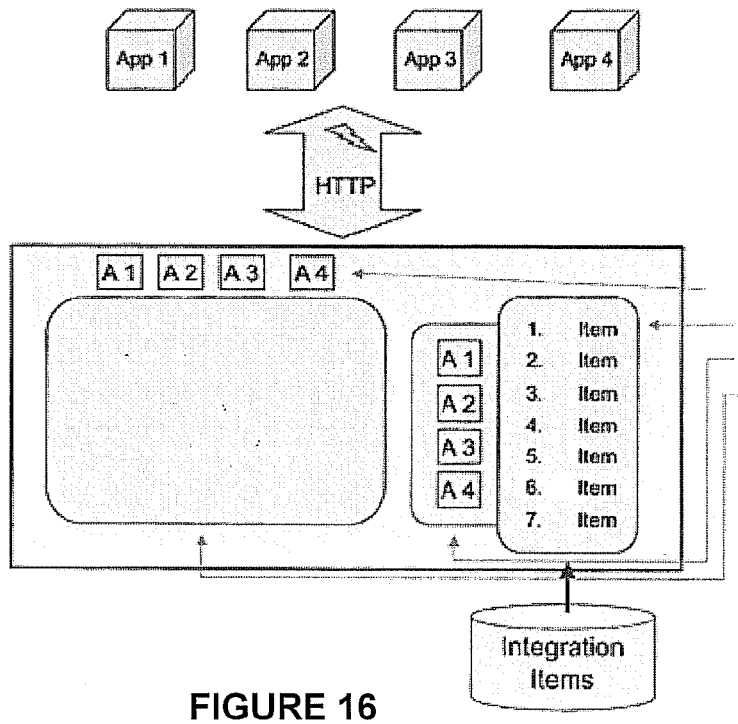
Figure 17:
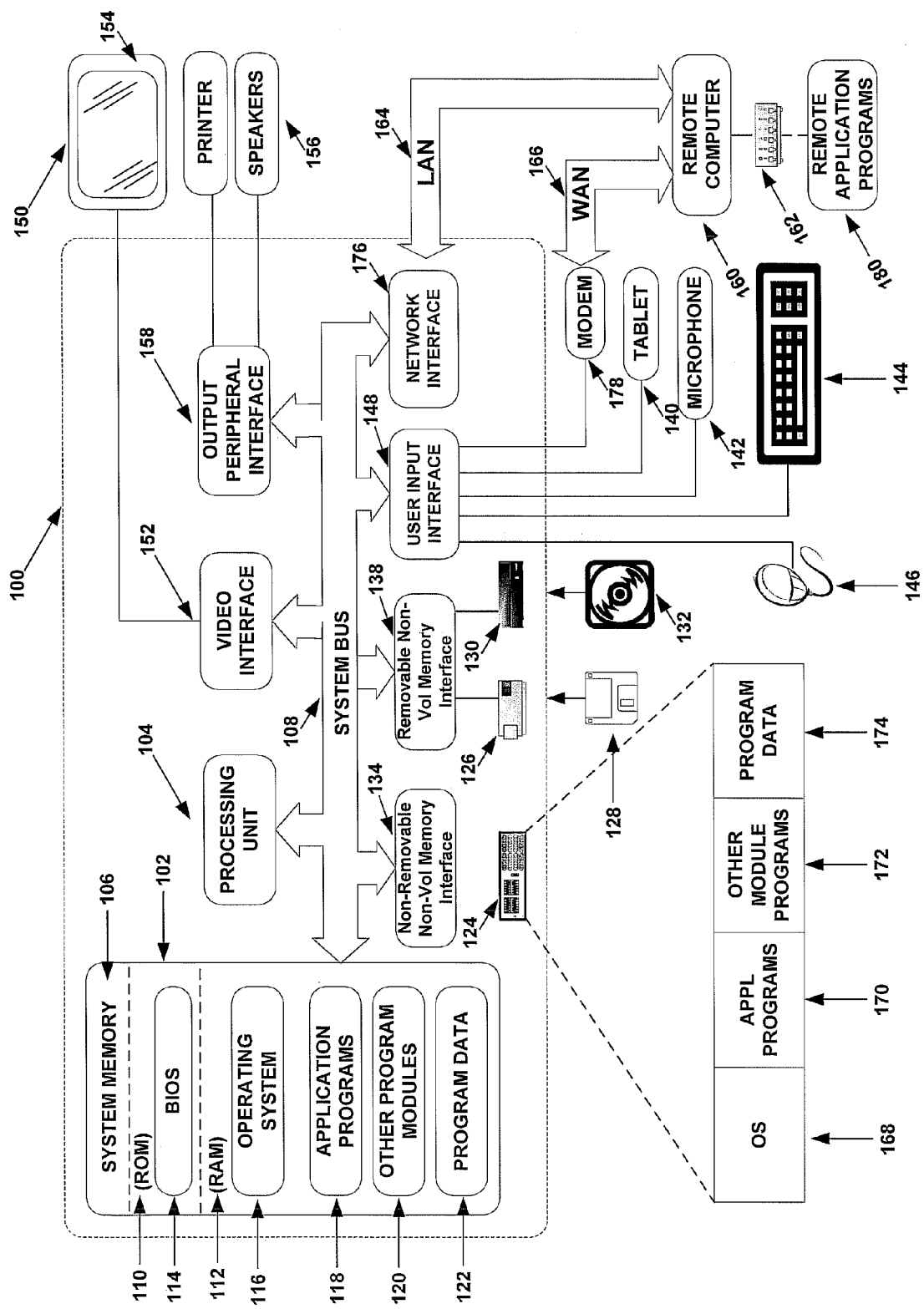

FIG. 9 provides an exemplary e-mail interface for further embodiment the present invention;

FIG. 10 depicts Internet telephony features of the present invention;

FIG. 11 illustrates Internet group functions enabled by the present invention;

FIG. 12 depicts a calendar interface and associated functions of the present invention;

FIG. 13A depicts an exemplary contact management embodiment of the present invention;

FIG. 13B presents an exemplary open contact card for showing certain aspects of the present invention;

FIG. 14 depicts additional functionality of the contacts window;

FIG. 15 illustrates a contextual flow diagram for the present invention, including a web application, various Internet protocols, and a web browser;

FIG. 16 depicts an application integration panel for one aspect of the present invention; and FIG. 17 depicts a general-purpose computer and operating environment in which the several embodiments of the present invention may be practiced.

DETAILED DESCRIPTION OF THE FIGURES

The following description is not to be taken in a limiting sense, but is made for the purpose of describing the general principles of the present invention and its embodiments. The scope of the disclosure should be determined with reference to the claims.

Reference will now be made in detail to the present embodiments of the invention, example(s) of which are illustrated in the accompanying drawings. Wherever possible, the same reference numbers will be used throughout the drawings to refer to the same or like parts (elements).

In accordance with the invention, the present invention includes a method for aggregating disparate web services and functionality via a graphical user interface, the method including the steps of generating a graphical user interface. The graphical user interface includes at least one active window capable of interfacing with a plurality of remote servers and initiating multiple threads with the plurality of remote servers. The method aggregates the functionality and services of the plurality of remote servers, wherein the aggregated functionality and services of the plurality of remote servers is controlled via the graphical user interface.

The present invention further includes a software product residing on a computer readable medium capable of directing a computer system, wherein the software product directs a computer system to perform the steps of generating a graphical user interface, wherein the generated graphical user interface further includes active windows capable of communicating and controlling data flow to a from a plurality of websites. Initiating multiple threads linking the graphical user interface and the websites and synchronizing common data residing at the plurality of websites and accessing and controlling the data flow to and from the websites via the active windows of the graphical user interface.

The present invention still further includes a system for aggregating and displaying disparate web services and functionality, the system includes a processor having memory, a display in communication with the processor and a software program, wherein the software program resides on a computer readable medium and is capable of directing the processor to perform the steps of generating a graphical user interface, wherein the generated graphical user interface further includes active windows capable of communicating and controlling data flow to a from a plurality of web services sites; initiating multiple threads linking the graphical user interface and the web services sites; and synchronizing common data residing at the plurality of web services sites and accessing and controlling the data flow to and from the web services sites via the active windows of the graphical user interface.

The present invention additionally includes a method for aggregating disparate web services and functionality, the method includes means for generating a graphical user interface, which includes multiple active windows wherein each window capable of communicating with and directing a plurality of remote servers hosting the web services. The method further includes means for initiating and conducting simultaneously multiple sessions with the remote servers and means for aggregating and accessing functionality and services of the plurality of remote servers via the graphical user interface.

The present remote services access system is designed to provide users quicker and easier access to remote services. The remote services access system includes a suite of primary components including, but not limited to, (i) user controls, (ii) a data store, (iii) a synchronization engine and (iv) a unified results display area. Each of these components is discussed in detail below.

Figure 2:
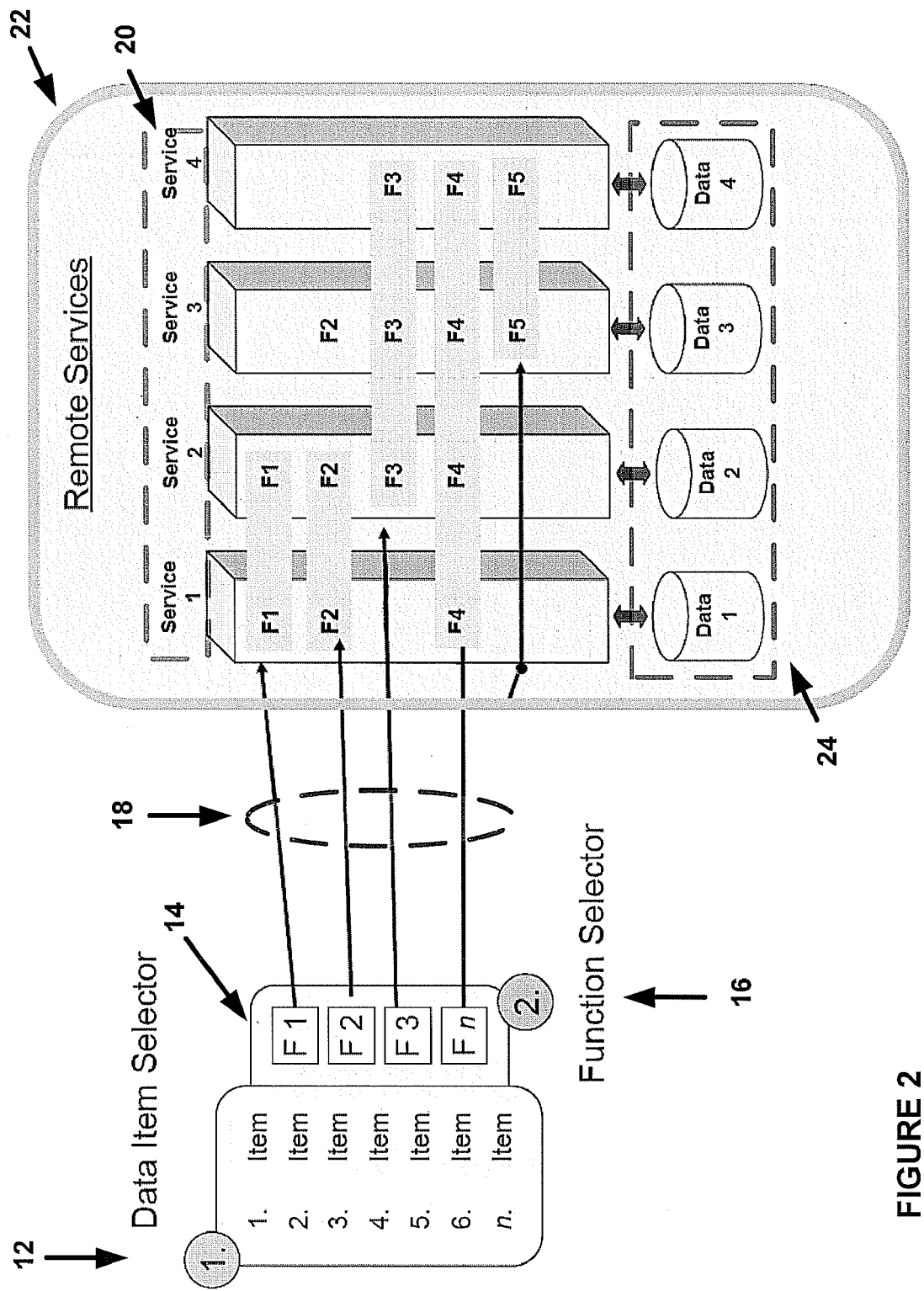

FIG. 2 depicts an exemplary manner in which the present invention facilitates control of remote functions. The user selects a data item via data items selector 12 and a function 14 to act on the data item 12 by initiating the function selector 16. The function selector initiates a series of threads 18 to interface with services 20 of remote services provider 22. The services requested interface with data store 24, which retrieves and stores the user's 4 data and transactions.

The remote services access system does not replicate the controls or functionality of a remote service provider, but rather provides a set of controls for initiating a processing session or thread 18 with any of a set of services 20, as shown in FIG. 2.

A thread or thread of execution is defined as (in its simplest form) a stream of computer instructions that is in control of a process. A multithread process begins with one stream of instructions (one thread) and can later create other instruction streams to perform tasks. Threads are a way for a program to split itself into two or more simultaneously running tasks. Multiple threads can be executed in parallel on many computer systems. This multithreading generally occurs by time slicing (where a single processor switches between different threads) or by multiprocessing (where threads are executed on separate processors). Threads are similar to processes, but differ in the way that they share resources.

Figure 3:
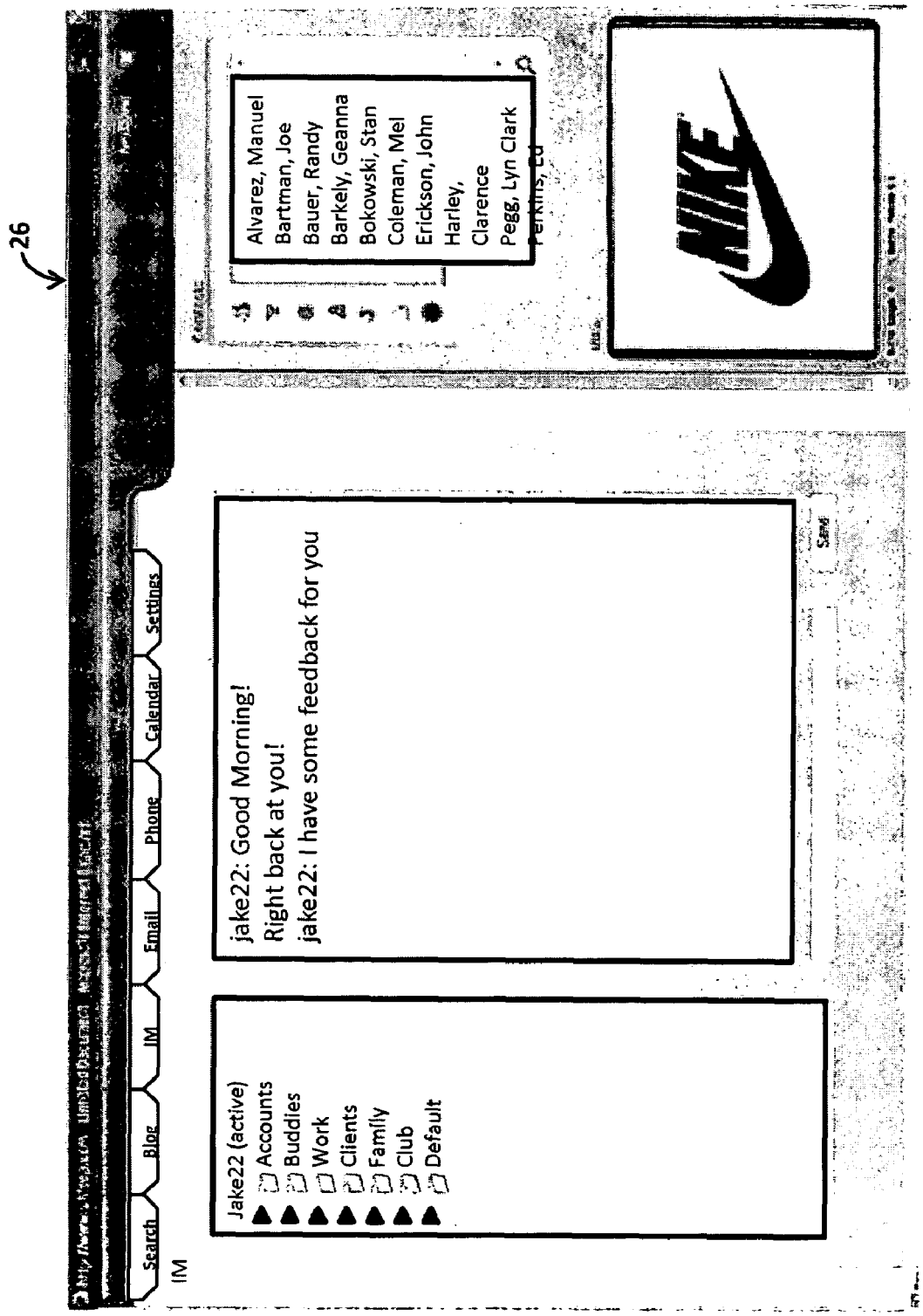

In the present invention once the session is started, work continues in the unified display area 26, as shown in FIG. 3, much as it would in any browser window. The distinctive feature of the present invention lies in how the services are launched.

Figure 1:
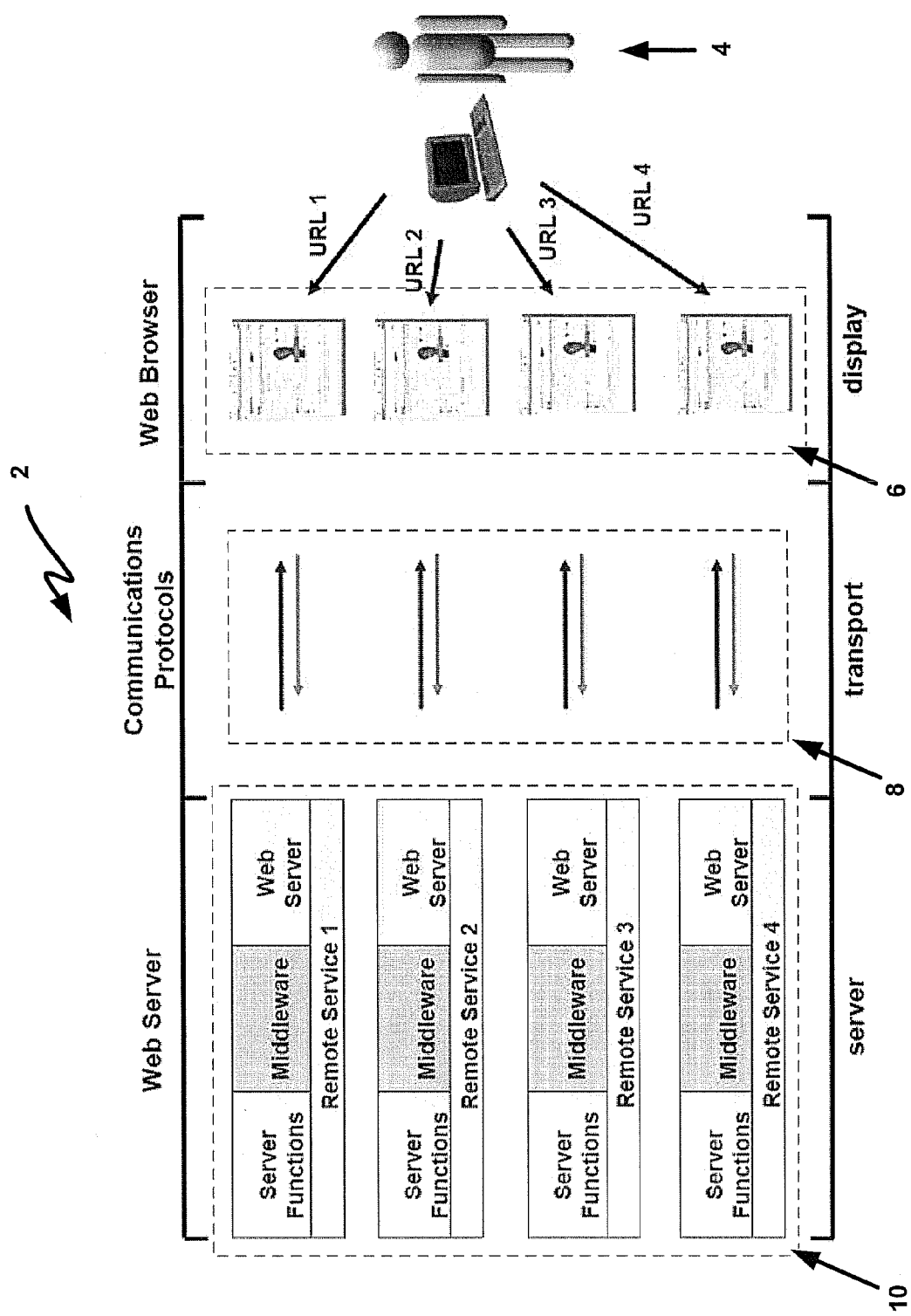

Normally, as depicted in prior art FIG. 1, initiating a session with a remote service would mean opening a new browser window via a link or bookmark, and operating within the data context provided by that service. One aspect of the present invention is that functional control is similar to a bookmark in concept and implementation. It allows the user to select a targeted function at the remote server, which is referenced by its uniform resource locator (URL). In addition to this bookmark capability, the remote services access system 22 is capable of designating a data item to be coupled with it.

For example, instead of simply following a bookmark to compose web mail, the user may select a recipient and navigate to a composition window already addressed to the intended recipient. In this manner, the user avoids looking up recipients in the address books for each remote mail service, and instead works from one consolidated data space. Similarly, the user may also quickly employ multiple services for the same contact, such as composing an e-mail and then initiating an instant messaging session.

The present invention applies in any context where the user has a set of frequently used services and a set of data items common to the services. In addition to commonly tracked data items such as e-mail addresses and instant messaging handles, contact data might include account numbers or other specialized information used for accessing corporate information systems.

While much of the present invention centers on several of its embodiments, the teachings of the present invention have a broad scope and a more generalized utility as would be appreciated by a person of ordinary skill in the art. The method, system and associated proprietary services permit viewing and using a set of related desktop and web applications that provides significant time savings and added convenience for the application user. The present invention and its attendant embodiments are relevant and applicable whenever separate programs have some commonality in function and/or services related to a set of data stored in the user's computer or at a remote hosting site. The present invention employs data processing techniques in the area of web browser technology, as well as novel techniques in computer user interface design to create compelling new ways for users to employ the capabilities of different software programs that have some common thread through a uniform interface presentation.

The present method and system are applicable when the user has a set of data items and a set of remote services that are frequently applied to those data items, examples of which are listed in the table below.

| Data Items | Remote Services |
| --- | --- |
| Contact lists of names | Web e-mail |
| Phone numbers | Instant messaging |
| e-mail addresses | IP telephone |
| Instant messaging handles | Web-based mapping |

FIG. 3 provides an exemplary user interface 26 for the present invention and illustrates that when the user selects a data item 12 and a function 14, as shown in FIG. 2, the corresponding remote service 20 is activated with an appropriate request, beginning the remote processing session on the user's unified results display 26.

Figure 4:
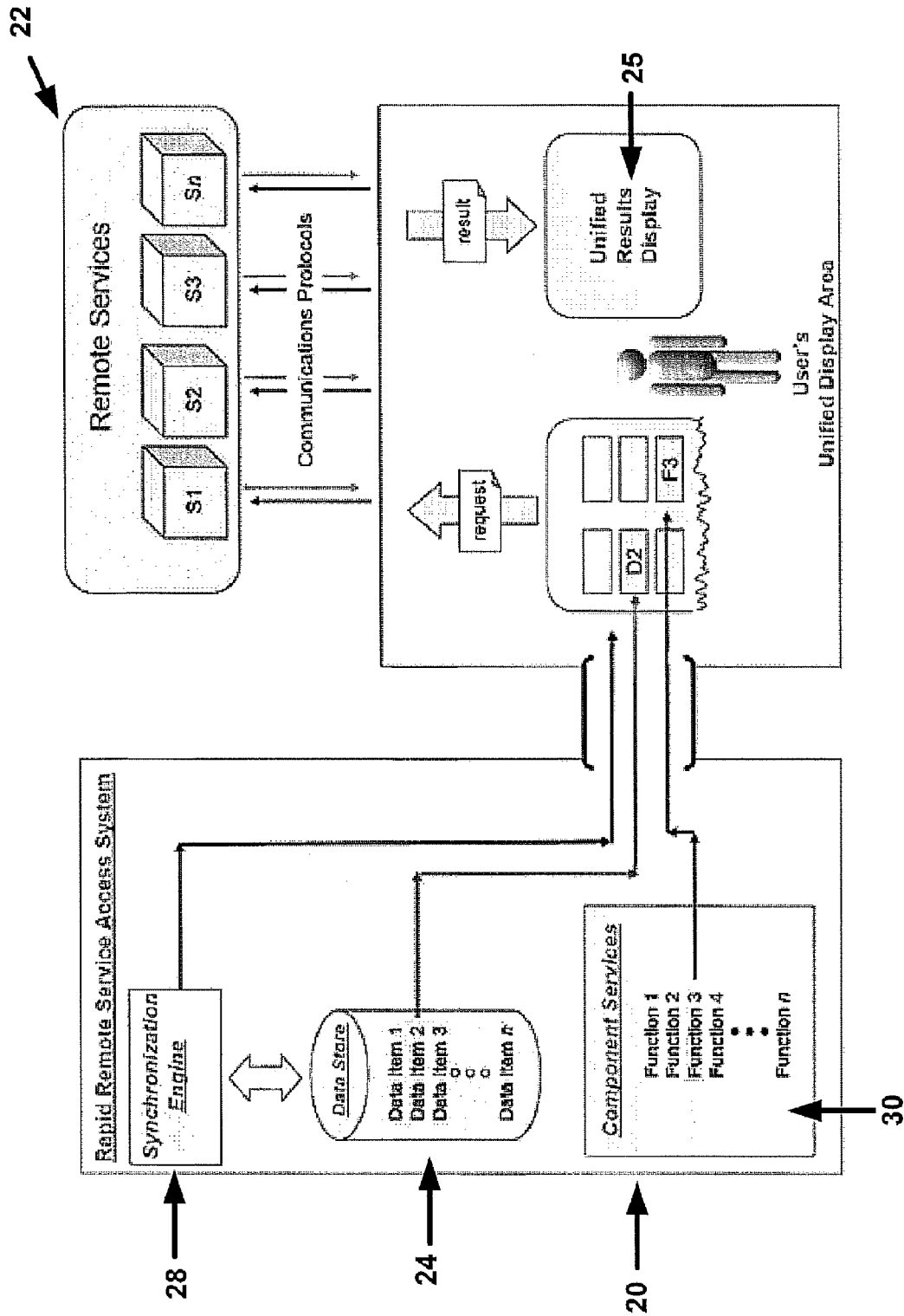

FIG. 4 depicts a high-level typology of the present invention. One benefit of using the present invention is that users of multiple remote applications or services have a common presentation view 26 of the remote services coupled with tools embedded in a functional engine 30 that makes accessing remote services 20 faster, while also ensuring the integrity and synchronization, via the synchronization engine 28, of the common data elements of the remote services 20.

The present invention provides a software tool that streamlines, simplifies, and integrates into one uniform application the core set of functions or capabilities compute users employ for communication, maintaining contact information, and calendaring. There are a broad variety of tools available to that enable computer users to communicate with one another. These tools are widely used today, with each tool typically serving a discrete function such as e-mail, instant messaging, Internet telephony, blogging, or online groups.

The present invention provides a novel application that integrates these tools (capabilities) into a single interface presentation creating a unique user experience. The native communication tools integrated herein, i.e., e-mail, IM, Internet telephony, and blogging, online groups effectively employ third-party applications displayed through a proprietary interface and integration application.

Instead of having to individually open and log into separate applications to perform communication functions, the present embodiment enables users to login once to the remote server and begin communicating by merely selecting the tab corresponding to the communication tool desired for use.

The present embodiment simplifies the user's navigation from one communication function to the next, while offering an integrated, consolidated contact management and calendaring function for all the communication tools. Importantly, The present system does not require the user to change from the current programs and tools used for e-mail, instant messaging, etc., rather these tools are accessed and used within the application. The common contacts and calendar utilities are a dramatic innovation that eliminates the redundancy and scattered nature of how this data currently disparately exists in the individual applications used by the end user.

The present invention currently integrates the functional application categories of (a) web searches, (b) blogging, (c) instant messaging, (d) e-mail, (e) phone service, and (f) group operations. To begin using the present remote services access system, a user downloads the application and runs an installer program. The user will be prompted to register as a user, and then be presented with a setup wizard. The setup wizard systematically completes the installation of the Remote services access system application; presents an interactive tutorial of the system, its functions, and how to employ them, and assists the new user through step-by-step instructions for setting up the present invention with his/her specific selections of communications tools and other application specific options.

Figure 5:
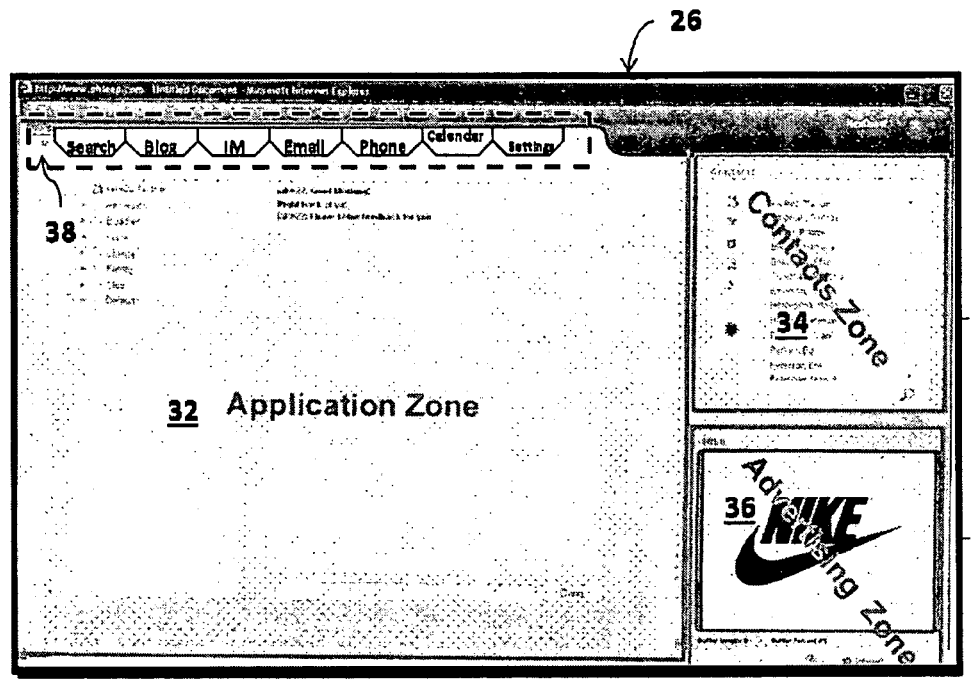

FIG. 5 presents a graphical user interface 26 for an embodiment of the present invention with respect to various functional zones or windows. The layout of the user interface 26 is a novel design element that creates the simplicity and superior usability for the end user 4. The present invention's interface is divided into the three primary areas, although more may be integrated into the system to address user needs and added functionality, of (a) an application window (or zone) 32; (2) a contacts window 34; and (c) an advertising window 36. The present application window provides an area within the interface where the end user views and uses the underlying communication tools for search, blogging, instant messaging, e-mail, Internet telephony, groups and calendaring. The present contacts window 34 provides a dedicated area of the interface for the integrated contact management function of present invention.

In an alternate embodiment of the present invention the remote server access system is accessed via a web browser and the user experience is totally performed by the remote service access system. An example of this would be in the case where the user is using a "thin" client, such as a cell phone or PDA. A thin client is defined in client/server applications, as a client designed to be especially small so that the bulk of the data processing occurs on the server.

Although the term thin client usually refers to software, it is increasingly used for computers, such as network computers and Net PCs that are designed to serve as the clients for client/server architectures. A thin client is a network computer without a hard disk drive, whereas a fat (or thick or rich) client includes a disk drive.

The contacts window 34 contains the tools to manage the user's contacts. It also contains icons that enable users to "flash communicate" with a contact, that is, it enables the user to begin communicating with a contact in just one click. This feature is more fully described below.

The advertising window 36 provides a segment of the interface that is dedicated to presenting advertisements. Advertisements may be presented in a variety of forms, ranging from a static image to a streaming video with audio creating a comparable experience to viewing a television Commercial.

Most of the functional components of the present application are accessed by clicking on one of the corresponding tabs in tab region 38. The contacts and advertising components are found in there respective, dedicated windows with the user options/setup component accessed by clicking the options/Setup link found near the upper right-hand corner of the Remote services access system graphical user interface 26.

Internet search engines are core utilities for computer users. During the initial setup of the present invention application users select the search engines utilities they wish to included in the present invention, such as Google, Yahoo, and Ask Jeeves®. Users are prompted to designate one search engine as the default or primary tool that is presented first when selecting the Search tab. Users may modify the search engines used in Remote services access system and change the designated default search utility at any time by via the options/setup menu.

The search tab, when selected from among the tabs in tabs region 38, presents users with their chosen default search engine displayed in the application window. The utility will appear just as it does in a web browser, with the exception that it is scaled to fit into the application window. With the Search tab selected a list of sub tabs 40 is presented showing the one sub tab for each search engine the user has chosen to employ with present invention.

Figure 6:
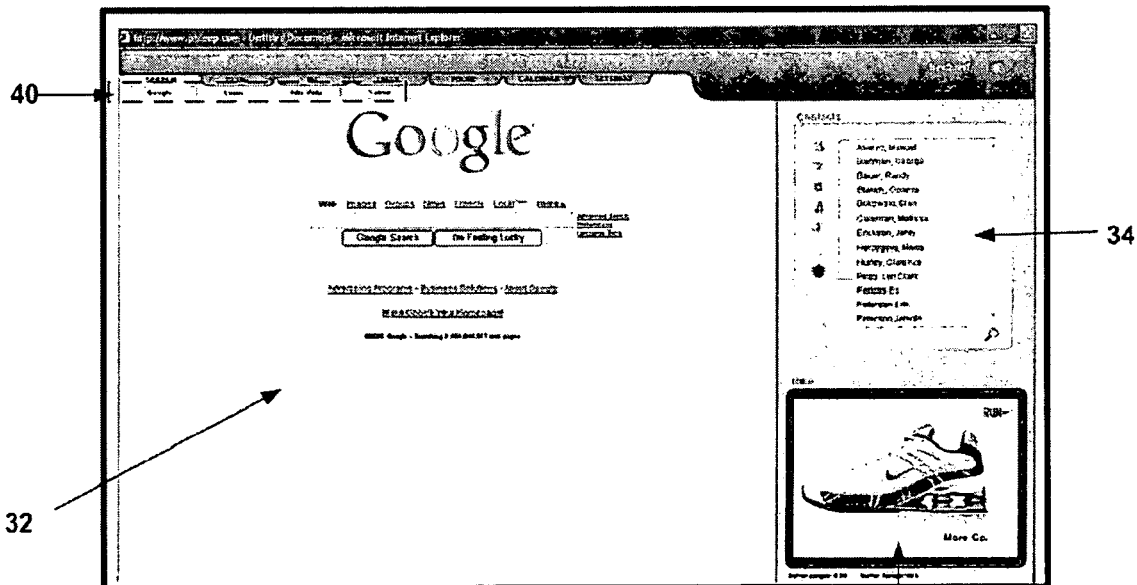
FIG. 6 shows a search tab presentation for the searching functions of the present invention.

FIG. 6 displays a search tab presentation for the searching functions of the present invention. Search engines function identically in present invention as if they were being used in a web browser. Search terms are entered and the results are presented in the applications window. To switch from on search engine to another the user merely selects the sub tab corresponding to the search engine desired for use.

Figure 7:
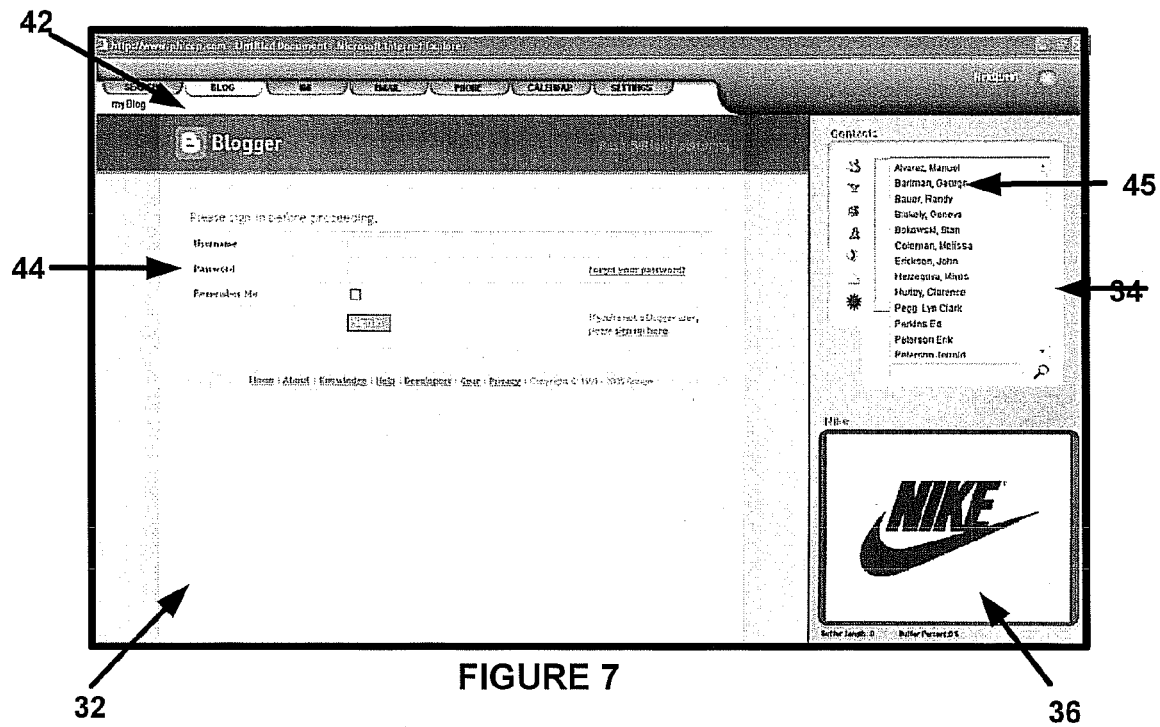
FIG. 7 depicts a blog tab interface demonstrating an aspect of the present invention.

FIG. 7 is a blog tab interface demonstrating a further aspect of the present invention. Blogging is an increasingly popular form of online communication and supported in the by the present invention. In similar fashion to Internet Search, during the initial set up of the present remote services access system, new users select the blogging software or Internet programs they wish to employ in the present system. The installation wizard takes new users through a step-by-step process for configuring the blogging programs for employ in Remote services access system, including the enabling of an automatic login feature whereby the present embodiment logs into the blogging applications for the user, thus relieving the user of the time and effort required for this task. The present invention includes an automatic login feature is available for all communication programs chosen by user for employ in Remote services access system.

The Blog tab, when selected, opens the default blogging program 42 designated by the user. The blogging application 43 is presented in the application window and is used in the same manner as if accessed via a web browser. The user may choose more than one blogging program to employ in the present invention. The installation wizard assists the user in configuring blogging programs for use, and creates the sub tables used to navigate among these programs in similar fashion to the navigation among search engines via the Search tab.

A novel feature of the present invention's blogging capability is a present linkage of the user's contact information with the Blog tab. In creating a contact in the remote services access system 22 (e.g., in the contact zone 34), in addition to the typical information entered about the contact such as name, address, phone, e-mail, etc., the contact's blog address may be specified. The user may then view this contact's blog at anytime by merely clicking once on the contact's name 44 in the contacts window 34 and then clicking the Blog flash icon 45 located to the left of the contact list. The contact's blog is then displayed in the applications window for the user to read.

Figure 8:
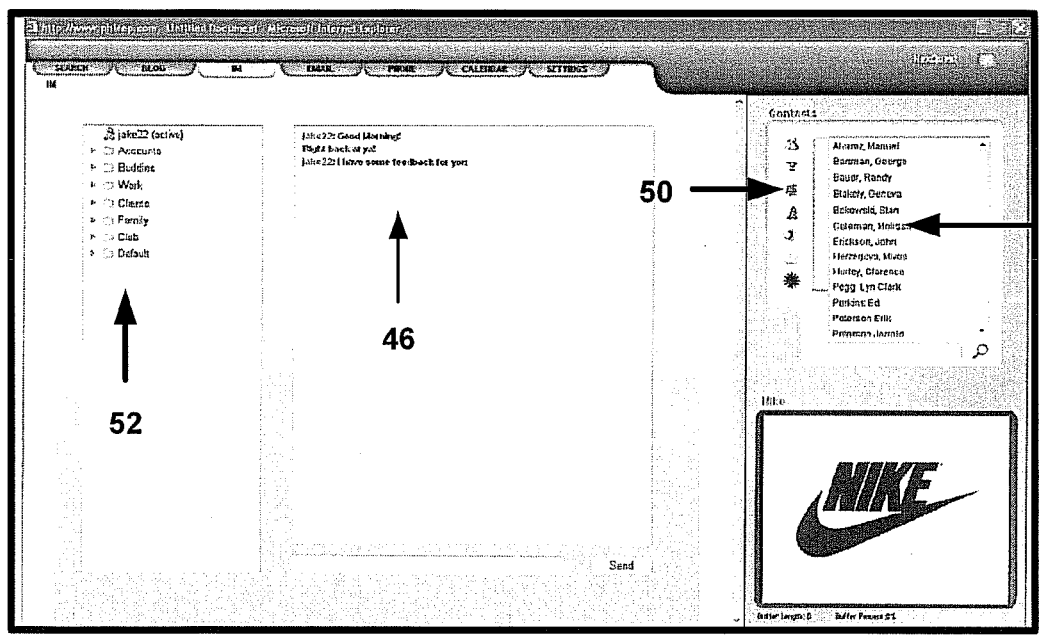
FIG. 8 depicts a universal instant messaging interface for showing an aspect of the present invention.

FIG. 8 presents a universal instant messaging interface 46 for depicting a further aspect of the present invention. There are many instant messaging (IM) applications freely available for users to download and use. For most of these IM tools, however, users much employ the same IM application in order to communicate. This necessitates that users either employ multiple IM tools or limit their breadth of their instant messaging connectivity. The present remote services access system solves this problem by utilizing a universal instant messenger (UIM) 46, a tool that allows a user to communication with others regardless of which instant messenger utility they may be using.

During initial setup, the installation wizard helps new users configure the UIM and enables the automatic login feature if needed. To begin instant messaging, the user clicks on the IM tab found at the top of the applications window 32. The UIM 46 will be displayed in the applications window 32 and ready for use.

The disclosed instant messaging system is also integrated with the contacts function. To begin an instant messaging session, the user single clicks on the contact's name 48 in the contacts window and then single clicks on the IM flash icon 50. This opens the UIM tool 46 in the applications window and starts an IM session with the selected contact. Alternatively, a user may initiate an IM session directly via the IM tab. By scanning down the left had column 52 of the UIM 46, the user may visually see which contacts are online and available for instant messaging. Double-clicking on an available contact in the let-hand column will initiate an instant messaging session with the contact in the dialogue area to the right.

Figure 9A:
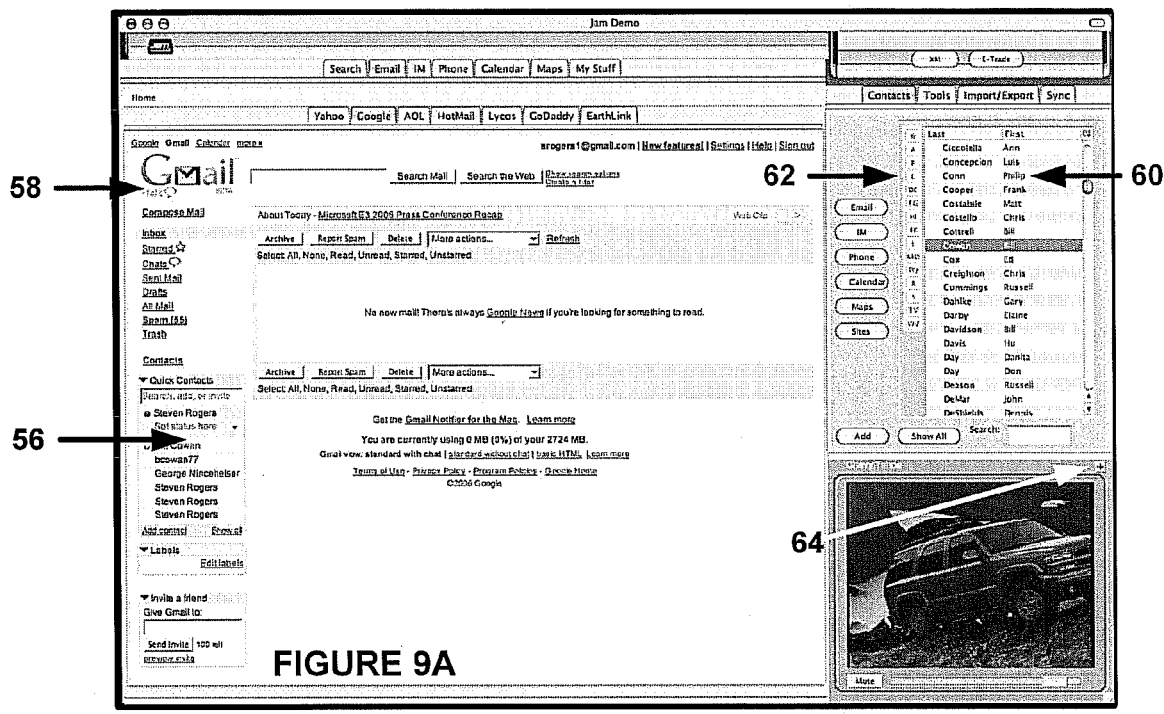

FIG. 9A provides an exemplary e-mail interface for yet another novel aspect of the present invention. Whether someone has one e-mail address using a lone e-mail program, or many addresses using multiple e-mail applications, the e-mail function delivers a simplified method for communicating with e-mail. E-mail programs are very sticky, meaning users tend to have a strong aversion to changing e-mail programs. The reasons for this are many. Users become comfortable with the tools they currently use. People prefer to avoid the hassle of learning a new tool and the potential for data loss when migrating to a new application. Plus, there is the burden of notifying the "world" of a change in e-mail address.

With this dynamic in mind, the e-mail function was deliberately designed to allow users to continue using their current e-mail programs, but enabling them to do so within the present invention system. During the installation process, users specify and configure the e-mail programs they wish to employ in the Remote services access system using the installation wizard. The automatic login feature is also enabled at this time.

E-mail is accessed via the e-mail tab from tabs 38, with the e-mail program displayed in the applications window 32. The e-mail sub tables 58 allow the user to navigate among the different e-mail programs configured by the user for employ with the present invention. Clicking the e-mail Tab causes the user's default e-mail program to be displayed in the applications window 32. The default designation is specified by the user as part of the initial installation process via the installation wizard. The default designation may be modified at any time by the user via the options/setup menu.

To employ e-mail, the user has two options. The user may select the e-mail Tab, choose the e-mail program desired, and begin performing his/her e-mail tasks. Alternatively, the user may leverage the integration of e-mail with the contacts capability to quickly and easily send e-mail. To do so, the user clicks once on the contact's name 60 in the contacts window 34 and then clicks on the e-mail flags icon 62 located to the left o the contacts list. Upon clicking the flash icon 62, a small drop down box will appear below the icon listing the e-mail programs the user has configured in the present invention. The user then selects the e-mail address entered in the "Sent To" line and the user's address in the "From" line. The user merely needs to enter a subject and type the message.

Figure 9B:
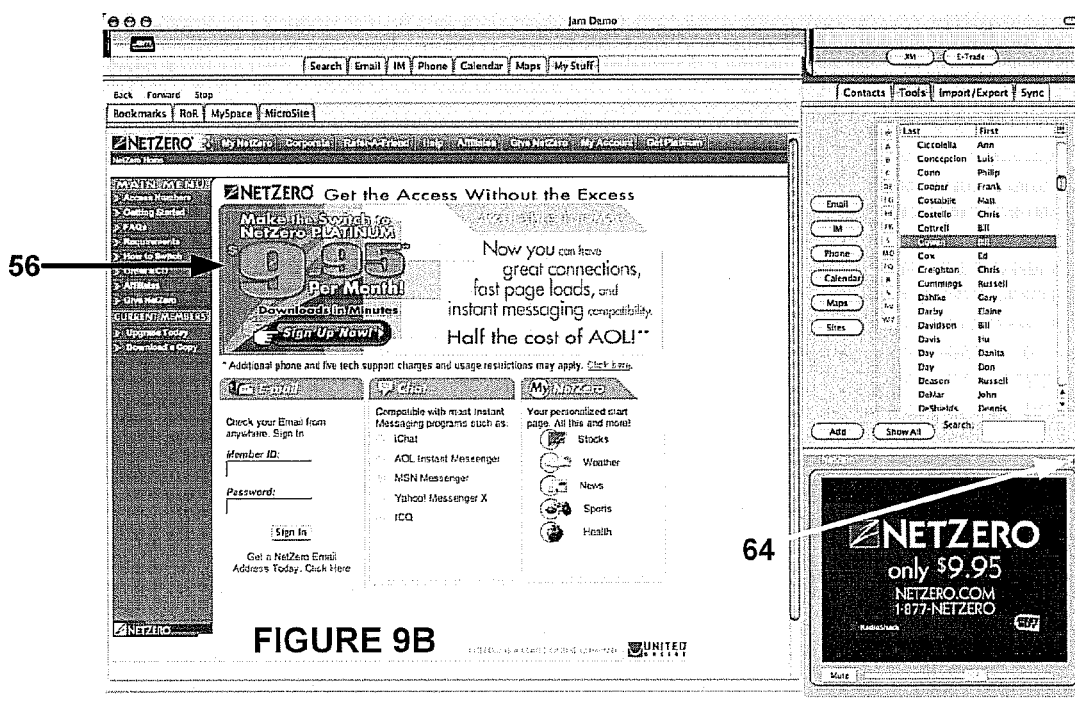

While sending a receiving e-mails, the user will be sent advertisements via advertisement window 36. If the user would like to know more about the particular advertisement all the user simply has to do is hit the advertisement button 64. Once activated, the advertisement is now displayed in the applications window 32, as shown in FIG. 9B. Once the advertisement is in the applications window 32, the user may sign up for service being offered or do further investigation of the advertisement via the applications window. When an ad in the Ad Display Area 36 is clicked on, a site for the advertiser is opened in the Service Display Area. Additional functionality herein includes, when the ad is clicked, buttons are activated linking the user to the advertiser so that instant communication can be initiated by the user via the communication services supported by the advertiser such as phone, email, instant messaging and etc.

FIG. 10 depicts Internet telephony features of the present invention. Internet telephony is one of the fastest growing segments of online communications. The present invention delivers a novel combination of functionality in the present invention. The Internet telephony function in the remote services access system is comprised of three primary elements, each accessed via a separate sub tab in the applications window. The first sub tab, labeled Skype, allows the user to make and receive Internet-based phone calls from their computer. All the user needs is a microphone and speakers, or a combination microphone-headset plugged into the computer and Internet Skype® may be used.

Skype® is a third party application operating as an embedded tool. It is a highly intuitive service, and calls made from one Skype user to another are free regardless of where the calling parties are located around the globe. All that is needed is an Internet connection to begin making and receiving calls.

The present invention contemplates the use of Skype® as one vendor for such Internet telephone service, although many others may be also employed Additionally, programs, java scripts, browser and software plugins may be added to the remote services access system to provide additional functionality, maintenance to the system or migration to an alternate software and services packages.

A second sub tab 68 is labeled VOIP, for voice over Internet protocol. Many residential and commercial customers of traditional phone companies are switching to VOIP for phone service. VOIP is provided by a number of Internet service providers and cable companies. To employ the service, users plug their standard phone into a special modem (supplied by the vendor) or directly into their computer, or employ a browser-based Internet dialer program supplied from the vendor. The present invention enables users to employ these Internet dialer programs 70 within Remote services access system.

The installation wizard assists the user to configure the Internet dialer program during the installation of the present invention. Then, by selecting the VOIP sub tab users may quickly and easily make calls through their computer using their VOIP service. The Internet dialer program is presented in the applications window and used just as it would be if accessed via a web browser. Proprietary service does not charge for its portion of this functionality. Any monthly service fees or call charges for VOIP service is solely a function of the service agreement between the user and the VOIP service provider.

The third sub tab 72 is labeled Cell/PDA. The present invention enables users to make and receive calls through their computer and their cell phones or phone-enabled PDAs. Remote services access system connects with these devices via a Bluetooth wireless connection or using a USB cord. A novel interface in the present invention makes utilizing this function highly intuitive for users.

Each of the Internet telephony sub tabs is integrated with the contacts window. Users may initiate a call by making a single click on a contact name and then clicking the Phone flash icon. This will initiate a small drop down menu that appears beneath the phone flash icon allowing the user to select the Internet telephony service to employ for the call (Skype, VOIP, Cell/PDA). Clicking of the service initiates the call to the contact's primary phone number. For contacts with multiple phone numbers, double clicking on the contact's name in the Contacts window will open its address card. The user may then select, from the numbers listed, which to employ for the call. A telephone icon is next to each number in the address card. Clicking on this icon will initiate the call.

FIG. 11 portrays Internet group functions enabled by the present invention. Internet groups are popular online services that allow people of common interests to come together through a website and e-mail group. Yahoo, Google, and others offer the tools to create, manage and host online groups. The remote services access system groups tab provides users access to their online groups in comparable fashion to other present invention services. During installation of the remote services access system, a setup wizard helps configure a user's existing groups for inclusion in the system. Once configured, the user merely clicks on the groups tab to being using this function. The designated default group is initially presented in the applications window. For users who are members of multiple groups, a sub tab will be presented for each group, enabling user to quickly and easily navigate from one group to the next by clicking on the desired sub tab.

Internet groups also may be integrated into the contacts window. When initially setting up groups or joining a new one, the user may add the group as a contact in the contacts window. From the contacts window, the user may access a group via a single click on the group name and then clicking the groups flash icon located to the left of the contact list. This will open the selected group in the applications window.

The present invention also supports E-mail for Internet groups in the contacts window. E-mailing group members is a standard function provided in Internet group programs. The remote services access system, however, provides an easy and efficient method to initiate an e-mail to an Internet group from the contacts window. A single click on the group name in the Contacts window or window and a click on the e-mail flash icon is all that is required in the present invention. The e-mail address and program designated for deployment with the chosen Internet group will be executed (the reader should note that the program is already running and is placed in a stand by mode waiting instructions, with the "From" and "To" addresses automatically filled in. The user just enters a subject and composes the message as is routinely done, without the need of having to access a second or third web services to get the required address.

FIG. 12 depicts a calendar interface 76 and associated functions of the present invention. The calendar tab provides access in the present invention to computerized calendar programs. The installation wizard assists the new user to specify and configure calendar applications, including the selection of a primary calendar. The primary calendar is the master calendar for the user. Most of the popular web-based and desktop calendar applications may be selected as the master calendar.

The setup wizard helps the user configure his/her calendar for employ in present invention. The calendar is displayed in the applications window just like the other tools used in Remote services access system. In addition to the master calendar, a user may add secondary calendars in the present invention. These additional calendars may be public and private calendars for organizations, clubs, and business or to fill other similar scheduling needs. Via the options/setup menu, users may simply add secondary calendars to Remote services access system and sub tabs to the calendar tab. Selecting the desired sub tab will present the calendar in the applications window.

While a user may select almost any web-based or desktop calendar program as the master calendar in present invention, by choosing one of the designated "power selections," a wealth of additional calendar related features are available to the user. The system calendar power selections are calendar programs that are specifically supported by present invention and include may of the most popular applications including Outlook, Yahoo calendar, and Day Timers.

Powerful incremental features available in present invention when using the present system's power selection calendar program as the master calendar include a synchronization function whereby the master calendar may be synchronized with external devices such as cell phones, PDAs, or other computers. Synchronization is performed via activation of synch tab in the contacts window 34. One click scheduling is available from the contacts window, by clicking on a calendar flash icon next to the contacts list, the master calendar will be opened and displayed in the applications window 32. An appointment will be opened with the contacts name pre-filled, the user merely needs to select the appointment date, time and save it.

The present invention provides a communication hub, combining communication tools with calendaring and contact management functions, remote services access system offers a unique approach to universal communications management.

As a hub, present invention functions as the focal point for a user's communications, calendaring and contacts management activities. Synchronization is a key function designed to keep the other devices a user uses, such as cell phone, PDAs, or other computers, up to date with the most current data. The synch tab accesses the synchronization utility. During installation or later via the options/setup menu, the user may specify and configure the devices to be synchronized in the present invention. Devices may be synchronized using a wired connection to the computer (such as a USB cord) or via a wireless, Bluetooth connection if both the device and compute on which Remote services access system is operating supports such connections.

To perform synchronization, the user selects the synch tab, which opens the utility in the applications window 32. Devices that are available for synchronization in present invention are displayed. To launch the process, the user merely clicks on the desired device's icon displayed. Contact, calendar and/or other data (as configured during the setup process) will then be synchronized between Remote services access system and the device. The user is notified when the process is complete and the present invention is available to synchronize the next device.

The synch tab also contains the data backup utilities for Remote services access system. Data backups may be done locally to the hard drive of the user's computer. Additionally, a subscription service is offered to users to confidentially and securely back up their system via present invention vault. With a vault subscription, users may back up their data to a confidential and secure server hosted by proprietary service. This service is described more fully below.

FIG. 13A depicts an exemplary contact management application of an embodiment of the present invention. The present invention's contacts window 34 provides users a simplified way to manage their contacts while integrating contact management activities with users' communications tools to create a unique and universal communications application. There are two primary aspects to the contacts window: (i) contact management, and (ii) integration of contacts with other Remote services access system functions.

As depict in FIG. 13A, a user is added in his/her navigation of the contacts engine 78 via flash icons 80, alphabetical index 82, contacts list 84 and search window 86.

FIG. 13B presents an exemplary open contact card 79 for showing certain aspects of the present invention. One aspect of contact management system of the present invention is to help users organize, manage and easily access the contact information of people and organizations to which they wish to be connected. As part of the installation process of the present system, contact information currently stored in other applications or devices may be loaded into a contacts database. Going forward, users may employ the present remote services access system for updating contact information and, through the present invention's synchronization function, push these updates out to devices and applications connected with the remote services access system.

Double clicking on a contact name in the contacts list 84 opens the information card 79 for the contact. To edit information in the card, the user clicks on the desired field and begins typing. Upon exiting the card by clicking the Save button, any revised information is updated and saved. To add a new contact, the user clicks the Add Contact button and a blank card is opened for the user to complete. The contacts card supports multiple addresses, phone numbers, e-mail addresses and other contact information.

There are several options available to the user to find a contact. First, the Windows® style scrolling area 81 located to the right of the contacts list may be used to find a contact. Second, the alphabetical index 82 to the immediate right of the contacts list may be used. By dragging the cursor down the alphabetical index, the letters of the alphabet are highlighted. Clicking on a letter will present all the contacts whose names begin with that letter. Finally, the user may type in a name into the search window 86 located at the bottom of the contacts window. This will highlight the contact's card if a match is found.

By clicking on the notes button located in a contact's card, a notepad for the contact is opened. The user may type free text into this area. The contact notepad is a convenient way for users to take notes of meetings/discussions with a contact or store other pertinent information. The user exits the notepad upon clicking the Save button, and the information entered in the note pad is stored.

FIG. 14 depicts a tab menu above the contacts window 34. The tab menu has tabs for contacts 78, tools 88, import/export functions 90 and sync function 92.

The present invention also provides for integration of contacts with other system functions. A unique and novel aspect of the present invention is the integration of the contacts window 34 with the other communications functions of remote services access system. Navigationally, the flash icons 80 enable users to easily and quickly begin communicating with a contact via the preferred method of contact. A contact is selected by a single click on its name in the contact list 84. The user then clicks on the flash icon 80 of the particular tool (e-mail, phone, IM, etc.) that corresponds to the action the user wishes to engage in with the contact. For functions, such as e-mail, where the user may have multiple applications configured for employ in the present invention, a drop down menu will appear upon clicking the flash icon allowing the user to select the specific tool for usage.

A further aspect of the present invention is the ability of the Remote services access system to provide real-time contact status information for communications applications that support this function. Using Internet telephony as an example, the Skype® service supports this functionality. When viewing contacts within the Skype® service, next to each contact is a symbol that indicates whether or not the contact is currently available via the Skype® service.

This knowledge is captured in the contacts window of the present invention and provides insight to the user at the time the user is selecting the method of communication for a contact. In an open contact card, a symbol next to the contact's Skype® service information indicates whither the user is currently accessible via the Skype® service. If using the flash icon 80, upon clicking the icon the items in drop down menu are color coded to indicate availability. Again, the availability of this function in the present invention is dependent upon whether the native application selected for employ by the user supports this capability.

The real time contact functionality, as previously described, can also be employed in instant messaging sessions and other similar activities. Generally, if a user is on-line an icon or avatar is shown to friends of that user, letting the user know that they are available for starting a session. This can also be employed in gaming communities, chat rooms and conference calls.

Finally, the remote services access system of the present invention includes a contact monitor. If the user activates this function, the present invention will monitor the contacts the user connects with using the Remote services access system. The contact monitor compares the e-mail addresses, instant message IDs and phone numbers used in the system (receiving and sending) to those disposed in the contacts window. If the item is not recognized by the system, the user will be prompted whether or not to save this information either as a new contact or to an existing contact's file. This utility assists the user in keeping contact information current and complete. The contact monitor may be configured at the root level, so users have maximum flexibility in determining which communication programs they wish to have actively monitored.

The advertising window 36 is an additional aspect of the present invention. This application (subsystem or subroutine) module acts as an interactive presentation area. The present invention delivers and displays advertisements in this space to the end user. The ads have a host of formats from still images to high quality videos with sound. Most ads run for thirty seconds, but short spots or longer infomercial-type ads are also supported and contemplated by the present invention. Ads may be static or are interactive, in that by clicking on the ad in the advertising window, the applications window will display linked content from the advertiser. The linked content could be the advertiser's website, a printable coupon good for in-store redemption, or other direct, online offers—such as presenting a shopping cart to purchase the product online, even offering a promotional discount if the user completes the transaction immediately.

A proprietary service may operate an advertising management system in its datacenter. Advertisers may access this system via secure login at proprietary service website to purchase advertising time, submit the advertisements to be presented to user, view activity data related to their account, and configure the location that users connect to when their ad is clicked on. The staff at such as service may employ the advertising management system to operate and control the advertising window. The system queues and streams ads to open present invention sessions, measures performance characteristics and statistics, and monitors for system problems.

The remote services access system configuration settings and option selections may always be modified by the user at a later time by going to the options/setup menu. In a fashion similar to how popular antivirus software transparently performs application updates, Remote services access system embeds the capability to automatically perform system updates for users. Upon launching the system, the present invention connects to the proprietary service website to determine if an update is available. If a more current version of remote services access system is available, it will be downloaded to the user's computer. The user will be notified that an update is available and asked if he/she would like to install the update now or at the end of the current present invention session. Since updates may require that the user's computer be restarted following installation of updates. This option is presented to the user as a method for maximizing the convenience of keeping Remote services access system current balanced with the need to employ the product.

Via a login function on the website, advertisers may gain secure access to the proprietary service's advertising management system. In the advertising management system, advertisers may purchase advertising time, upload their ads, view activity/statistics reports pertaining to their ads, and see other information about their account. Advertisers may also initiate live chats using the Remote services access system tool converse with proprietary service's advertiser support team.

A remote services access system vault of the present is a data security service whereby subscribers may easily create a backup of their contacts and system related data, encrypt and securely transfer the backup via the web, and store this information securely in proprietary service's Remote services access system Vault. While a utility to perform local backups is incorporated in the present invention, the remote services access system vault service adds an important layer of protection for users in the event heir computer becomes damaged or otherwise suffers data corruption. This utility allows users to encrypt their data before it is transferred into the vault, adding another layer of security. The system vault is analogous to a safety deposit box in that proprietary service merely safeguards the information in the vault and never accesses users' files for any reason.

Subscribers access the utility to create a backup and store it in the vault through the synch tab. Subscribers click on the vault tab to open the backup wizard. The wizard asks the subscriber to confirm they wish to perform a vault backup. Upon answering the affirmative, a backup file is created. The subscriber is given the option to encrypt the backup file, and if electing to do so, is prompted to input a lengthy password and to reconfirm it. The subscriber is then notified that they file is ready to be placed in the vault. Selecting "Send to Vault" deposits the file securely in the vault. A confirmation message is presented to the user to verify the completion of this transaction.

To restore data in the event of a problem, the subscriber navigates to the synch tab 92, selects the vault tab, and then selects the Restore button to open the restoration wizard. The user is then asked for his/her ID and password and connected to the vault. Upon authentication, the user is presented with a list of backup files associated with his account. The user selects the file to backup and clicks on restore now. If the file is encrypted, the wizard will require the user to enter the correct encryption password in order to perform the restoration function. The wizard then performs the restore function and all contact and system configuration data should be back in place.

FIG. 15 illustrates a contextual flow diagram for the present invention, including a web application, various Internet protocols, and a web browser. Web applications are distinct from web sites in that they primarily perform a function rather than simply providing information. A web interface to e-mail is an example of a common web application. Web applications are widely used to provide business-to-business services such as inventory checks, as well as services designed for individuals such as online banking. These applications operate over computer networks (typically the Internet) using widely available web browsers, and thus the web application provider's service is available anywhere the host computer network is available.

FIG. 16 depicts an application integration panel for one aspect of the present invention. The integration selector invokes the specified application's function for that data item. Each application may also be accessed without pre-selecting a data item by using the application selectors. The present invention's innovative approach to simplifying how users employ technology may be applied in any domain where a computer user frequently interacts with a set of applications using a common set of data items maintained locally. For example, staff in a medical office could employ the proprietary service approach to create a common, integrated view to access their disparate applications, programs including scheduling, digital radiology, billing, laboratory, and medical records. The common theme across these applications is the patient. The integration interface allows the staff a quicker and simplified way to target a comprehensive view of a patient in one place, versus having the "jump" from program to program. The patient is the contact equivalent in the present invention, and the applications are medical verses communications related.

The remote services access system may also provide an incremental set of tabs for relating strategic partners to the associated proprietary service. These new tabs, while small in number, offer a method for the system community to access value-added services provided by a partners. Such services include satellite radio broadcast; e-commerce connections to Amazon® or I-Tunes® services; and ticket purchasing to events, movies, concerts, etc. Also, the proprietary service expects to add the ability for users to create their own application tabs to as to personalize the remote services access system environment to their unique needs.

The application tabs create the conduit whereby a user may access other applications or services not in the standard set of communication tools supported by Remote services access system. For example, a customer service representative could employ a remote services access system for communication but add a tab for the accounting system so as be able to access the billing system within the present invention will communicating with the customer.

The data store contains a superset of data found on the user's remote services. The data store does not replicate the data of each remote service, but rather is focused on those data items needed to launch a service. The synchronization engine maintains copies of the remote data in the data store so that the data selector may present the entire range of choices open to the user across all services. display is to provide a convenient and integrated method for the user to manage the employ of display area for the potentially large number of he Internet Communications Interface sends and receives data using standard Internet protocols. This function may be provided by a web browser framework such as the Mozilla Application Development Framework, or by a commercial web development product such as Microsoft's Visual Studio. This component allows remote services access system to communicate with remote web services.

FIG. 17 depicts a block diagram of the hardware and operating environment 100 in which different embodiments of the present invention can be practiced. FIG. 17 provides an overview of computer hardware and a suitable computing environment in conjunction with which one or more embodiments of the present invention can be implemented. Embodiments are described in terms of a computer executing computer-executable instructions. However, some embodiments can be implemented entirely in computer hardware in which the computer-executable instructions are implemented in read-only memory. Some embodiments can also be implemented in client/server computing environments where remote devices that perform tasks are linked through a communications network. Program modules can be located in both local and remote memory storage devices in a distributed computing environment.

In FIG. 17, the computing system 100 is only one example of a suitable computing environment and is not intended to suggest any limitation as to the scope of use or functionality of the invention. Neither should the computing system 100 be interpreted as having any dependency or requirement relating to any one or combination of components illustrated in the exemplary operating computing system 100.

With reference to FIG. 17, an exemplary system within a computing environment for implementing the invention includes a general purpose computing device in the form of a computing system 100, commercially available from Intel, IBM, AMD, Motorola, Cyrix and others. Components of the computing system 102 may include, but are not limited to, a processing unit 104, a system memory 106, and a system bus 136 that couples various system components including the system memory to the processing unit 104. The system bus 136 may be any of several types of bus structures including a memory bus or memory controller, a peripheral bus, and a local bus using any of a variety of bus architectures.

Computing system 100 typically includes a variety of computer readable media. Computer readable media can be any available media that can be accessed by the computing system 100 and includes both volatile and nonvolatile media, and removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data.

Computer memory includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing system 100.

The system memory 106 includes computer storage media in the form of volatile and/or nonvolatile memory such as read only memory (ROM) 110 and random access memory (RAM) 112. A basic input/output system 114 (BIOS), containing the basic routines that help to transfer information between elements within computing system 100, such as during start-up, is typically stored in ROM 110. RAM 111 typically contains data and/or program modules that are immediately accessible to and/or presently being operated on by processing unit 204. By way of example, and not limitation, FIG. 17 illustrates operating system 116, application programs 120, other program modules 120 and program data 122.

Computing system 100 may also include other removable/non-removable, volatile/nonvolatile computer storage media. By way of example only, FIG. 17 illustrates a hard disk drive 124 that reads from or writes to non-removable, non-volatile magnetic media, a magnetic disk drive 126 that reads from or writes to a removable, nonvolatile magnetic disk 128, and an optical disk drive 130 that reads from or writes to a removable, nonvolatile optical disk 132 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 124 is typically connected to the system bus 136 through a non-removable memory interface such as interface 134, and magnetic disk drive 126 and optical disk drive 130 are typically connected to the system bus 136 by a removable memory interface, such as interface 138.

The drives and their associated computer storage media, discussed above and illustrated in FIG. 17, provide storage of computer readable instructions, data structures, program modules and other data for the computing system 100. In FIG. 17, for example, hard disk drive 124 is illustrated as storing operating system 168, application programs 170, other program modules 172 and program data 174. Note that these components can either be the same as or different from operating system 116, application programs 120, other program modules 120, and program data 122. Operating system 168, application programs 170, other program modules 172, and program data 174 are given different numbers hereto illustrates that, at a minimum, they are different copies.

A user may enter commands and information into the computing system 100 through input devices such as a tablet, or electronic digitizer, 140, a microphone 142, a keyboard 144, and pointing device 146, commonly referred to as a mouse, trackball, or touch pad. These and other input devices are often connected to the processing unit 104 through a user input interface 148 that is coupled to the system bus 108, but may be connected by other interface and bus structures, such as a parallel port, game port or a universal serial bus (USB).

A monitor 150 or other type of display device is also connected to the system bus 108 via an interface, such as a video interface 152. The monitor 150 may also be integrated with a touch-screen panel or the like. Note that the monitor and/or touch screen panel can be physically coupled to a housing in which the computing system 100 is incorporated, such as in a tablet-type personal computer. In addition, computers such as the computing system 100 may also include other peripheral output devices such as speakers 154 and printer 156, which may be connected through an output peripheral interface 158 or the like.

Computing system 100 may operate in a networked environment using logical connections to one or more remote computers, such as a remote computing system 160. The remote computing system 160 may be a personal computer, a server, a router, a network PC, a peer device or other common network node, and typically includes many or all of the elements described above relative to the computing system 100, although only a memory storage device 162 has been illustrated in FIG. 17.

The logical connections depicted in FIG. 17 include a local area network (LAN) 164 connecting through network interface 176 and a wide area network (WAN) 166 connecting via modem 178, but may also include other networks. Such networking environments are commonplace in offices, enterprise-wide computer networks, intranets and the Internet. For example, in the present embodiment, the computer system 100 may comprise the source machine from which data is being migrated, and the remote computing system 160 may comprise the destination machine. Note however that source and destination machines need not be connected by a network or any other means, but instead, data may be migrated via any media capable of being written by the source platform and read by the destination platform or platforms.

The central processor operating pursuant to operating system software such as IBM OS/2®, Linux®, UNIX®, Microsoft Windows®, Apple Mac OSX® and other commercially available operating systems provides functionality for the services provided by the present invention. The operating system or systems may reside at a central location or distributed locations (i.e. mirrored or stand-alone).

Software programs or modules instruct the operating systems to perform tasks such as, but not limited to, facilitating client requests, system maintenance, security, data storage, data backup, data mining, document/report generation and algorithms. The provided functionality may be embodied directly in hardware, in a software module executed by a processor or in any combination of the two. Furthermore, software operations may be executed, in part or wholly, by one or more servers or a client's system, via hardware, software module or any combination of the two.

A software module (program or executable) may reside in RAM memory, flash memory, ROM memory, EPROM memory, EEPROM memory, registers, hard disk, a removable disk, a CD-ROM, DVD, optical disk or any other form of storage medium known in the art. An exemplary storage medium is coupled to the processor such that the processor can read information from, and write information to, the storage medium. In the alternative, the storage medium may be integral to the processor. The processor and the storage medium may also reside in an ASIC.

The bus may be an optical or convention bus operating pursuant to various protocols that are well known in the art.

While various embodiments of the present invention have been described above, it should be understood that they have been presented by way of example only, and not limitation. It will be understood by those skilled in the art that various changes in form and details may be made therein without departing from the spirit and scope of the disclosure as defined in the appended claims. Thus, the breadth and scope of the present invention should not be limited by any of the above-described exemplary embodiments, but should be defined only in accordance with the following claims and their equivalents.

Various software embodiments are described in terms of this example computer system. After reading this description, it will be apparent to a person skilled in the relevant art how to implement the disclosure using other computer systems and/or computer architectures.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

We claim:

1. A method for integrating disparate web services and functionality via a graphical user interface, the method comprising the steps of:

generating a graphical user interface, wherein the graphical user interface includes at least one active window capable of interfacing with a plurality of remote servers;

initiating multiple threads with the plurality of remote servers;

establishing a thread with a host sewer, wherein the host server initiates multiple threads with the plurality of remote servers; and integrating functionality and services of the plurality of remote servers, wherein the integrated functionality and services of the plurality of remote servers is controlled via the graphical user interface.

2. The method of claim 1, further including the step of: storing integrated data from the remote servers at the host server.

3. The method of claim 2, wherein the integrated data is at least one of blogging Uniform Resource Locators (URLs), Really Simple Syndication (RSS) streams, e-mail addresses, instant messaging handles, calendars, contacts information, telephony addresses and groups and communities information.

4. The method of claim 2, wherein the integrated data is stored in a data store.

5. The method of claim 4, wherein the integrated data is encrypted.

6. The method of claim 1, wherein the graphical user interface further includes an application window, a contacts window and an advertising window.

7. The method of claim 6, wherein the application window further includes steps of displaying and controlling the remote servers functionality and services accessed by a user, and wherein the contacts window further includes steps of displaying and controlling the user's contacts and initiating on demand links to each of the user's contacts and wherein the advertising window further includes steps of displaying and formatting advertising content for the user's perusal.

8. The method of claim 1, wherein the graphical user interface is accessed via at least one of a thin client and a thick client.

9. The method of claim 8, wherein the thin client and the thick client is comprised of at least one of a PC, a laptop, a cell phone, a PDA and a computer tablet.

10. The method of claim 1, wherein the graphical user interface further includes an application window, a contacts window and an advertising window.

11. The method of claim 10, wherein the application window further includes steps of displaying and controlling the remote servers functionality and services accessed by a user, and wherein the contacts window further includes steps of displaying and controlling the user's contacts and initiating on demand links to each of the user's contacts and wherein the advertising window further includes steps of displaying and formatting advertising content for the user's perusal.

12. The method of claim 10, wherein the graphical user interface is accessed via at least one of a thin client and a thick client.

13. The method of claim 10, wherein the integrated data is at least one of blogging URLs, RSS streams, e-mail addresses, instant messaging handles, calendars, contacts information, telephony addresses and groups and communities information.

14. The method of claim 13, wherein the integrated data is stored in a data store.

15. The method of claim 14, wherein the integrated data is encrypted.

* * * * *

UNITED STATES PATENT AND TRADEMARK OFFICE
CERTIFICATE OF CORRECTION

PATENT NO.       : 7,607,092 B2                                             Page 1 of 1
APPLICATION NO. : 11/420976
DATED            : October 20, 2009
INVENTOR(S)      : Rogers et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 128 days.

Signed and Sealed this

Twelfth Day of October, 2010

David J. Kappos
*Director of the United States Patent and Trademark Office*